United States Patent [19]
Sturman et al.

[11] Patent Number: 5,598,871
[45] Date of Patent: Feb. 4, 1997

[54] STATIC AND DYNAMIC PRESSURE BALANCE DOUBLE FLOW THREE-WAY CONTROL VALVE

[75] Inventors: Oded E. Sturman, Newbury Park; Steven Massey, Camarillo, both of Calif.

[73] Assignee: Sturman Industries, Camarillo, Calif.

[21] Appl. No.: 304,879

[22] Filed: Sep. 13, 1994

Related U.S. Application Data

[63] Continuation-in-part of Ser. No. 223,440, Apr. 5, 1994.

[51] Int. Cl.⁶ .................. F15B 13/044; F16K 3/24; F16K 31/06
[52] U.S. Cl. .................. 137/625.65; 137/625.34; 137/625.68; 137/625.69; 251/129.07; 251/129.1
[58] Field of Search .................. 137/625.34, 625.35, 137/625.65, 625.68, 625.69; 251/129.07, 129.1

[56] References Cited

U.S. PATENT DOCUMENTS

| | | |
|---|---|---|
| 1,700,228 | 1/1929 | Kendall . |
| 2,912,010 | 11/1959 | Evans .................. 251/282 X |
| 2,930,404 | 3/1960 | Kowalski . |
| 2,934,090 | 4/1960 | Kenann et al. . |
| 2,946,513 | 7/1960 | Sampietro . |
| 2,967,545 | 1/1961 | Schmidt .................. 137/625.65 |
| 3,368,791 | 2/1968 | Wells . |
| 3,683,239 | 8/1972 | Sturman . |
| 3,718,159 | 2/1973 | Tennis .................. 137/596.12 |
| 3,743,898 | 7/1973 | Sturman . |
| 3,821,967 | 7/1974 | Sturman et al. . |
| 3,995,652 | 12/1976 | Belart et al. . |
| 4,046,112 | 9/1977 | Deckard . |
| 4,108,419 | 8/1978 | Sturman et al. . |
| 4,114,647 | 9/1978 | Sturman et al. . |
| 4,182,492 | 1/1980 | Albert et al. . |
| 4,219,154 | 8/1980 | Luscomb . |
| 4,275,693 | 6/1981 | Leckie . |
| 4,279,385 | 7/1981 | Straubel et al. . |
| 4,392,612 | 7/1983 | Deckard et al. . |
| 4,405,082 | 9/1983 | Walter et al. . |
| 4,409,638 | 10/1983 | Sturman et al. . |
| 4,482,094 | 11/1984 | Knape . |
| 4,550,875 | 11/1985 | Teerman et al. . |
| 4,605,166 | 8/1986 | Kelly . |
| 4,625,918 | 12/1986 | Funada et al. . |
| 4,741,478 | 5/1988 | Teerman et al. . |
| 4,770,346 | 9/1988 | Kaczynski . |
| 4,821,773 | 4/1989 | Herion et al. .................. 251/129.1 X |
| 4,979,674 | 12/1990 | Tiara et al. . |
| 5,036,885 | 8/1991 | Miura .................. 137/625.65 |
| 5,108,070 | 4/1992 | Tominaga . |
| 5,133,386 | 7/1992 | Magee .................. 137/625.65 |
| 5,143,291 | 9/1992 | Grinsteiner . |
| 5,251,659 | 10/1993 | Sturman et al. . |
| 5,463,996 | 11/1995 | Maley et al. . |

FOREIGN PATENT DOCUMENTS

| | | | |
|---|---|---|---|
| 2209206 | 8/1973 | Germany .................. 251/129.1 |
| 4-341653 | 4/1992 | Japan .................. 137/625.34 |
| 264710 | 1/1950 | Switzerland . |
| 349165 | 5/1931 | United Kingdom .................. 251/129.1 |
| 892121 | 3/1962 | United Kingdom . |

*Primary Examiner*—Gerald A. Michalsky
*Attorney, Agent, or Firm*—Blakely, Sokoloff, Taylor & Zafman

[57] ABSTRACT

A statically and dynamically pressure balanced fluid control valve. The valve contains a spool that is moved within an inner chamber of a valve housing by a pair of solenoids. The ports are symmetrically located on each side of a center port, wherein the resultant fluid forces on the spool are in opposite directions. The opposing forces create a net fluid force of approximately zero, so that the spool is dynamically pressure balanced when the valve is switched to a new position. The spool also has an inner channel and a pair of end openings that are in fluid communication with the inner chamber of the valve. When the spool is pulled to a new position, the end openings and inner channel allow fluid within the inner chamber to flow out of the space between the end of the spool and the housing. The flow of fluid through the end openings and inner channel prevent the formation of hydrostatic fluid pressure that will counteract the movement of the spool. The end openings and inner channel thus statically pressure balance the spool within the valve.

32 Claims, 2 Drawing Sheets

STATIC AND DYNAMIC PRESSURE BALANCE DOUBLE FLOW THREE-WAY CONTROL VALVE

This application is a continuation in part of Ser. No. 08/223,440 filed on Apr. 5, 1994.

BACKGROUND OF THE INVENTION

1. Field of the Invention

The present invention relates to a statically and dynamically pressure balanced three-way fluid control valve.

2. Description of Related Art

Control valves are typically used to control the flow of fluid in a hydraulic or pneumatic system. For example, control valves are commonly used to control the flow of fluid into and out of a hydraulic cylinder. FIG. 1 shows a conventional 3-way control valve that has a cylinder port (C) which can be coupled to either a return port (R) or a source port (S) by the outer groove of a spool. The spool is moved between a first position and a second position by a pair of solenoids. When the spool is in the first position, the cylinder port of the valve is coupled to the return port. When the spool is in the second position, the cylinder port is in fluid communication with the source port of the valve.

Although spool valves are ideally designed to prevent fluid from flowing into the inner valve chamber, machine tolerances, wear and other factors may result in a leakage of fluid into the spaces between the valve housing and the ends of the spool. A build up of fluid within the inner chamber of the housing may create a hydrostatic pressure that counteracts the movement of the spool. The counteracting hydrostatic pressure may slow down the response time of the valve. Additionally, the hydrostatic pressure may cause an improper seating of the spool. An improper spool seating will decrease the area between the spool channel and the port opening, resulting in an increase in the fluid resistance of the valve. It would be desirable to provide a spool valve that is statically pressure balanced to significantly reduce the effects of fluid leaking into the inner chamber of the valve.

The fluid that flows through the ports and the outer groove of the spool has a pressure and associated momentum which applies a force to the spool valve. As shown in FIG. 1, the force of the fluid may be directed in a direction opposite to the movement of the spool. The fluid force will counteract the pull of the solenoid. Relatively large counteracting fluid forces may decrease the response time of the value. Additionally, the fluid force may require larger solenoids to move the spool. Larger solenoids increase the size of the valve. It would be desirable to have a dynamically pressure balanced spool valve that is not significantly affected by the forces of fluid flowing through the ports of the valve.

SUMMARY OF THE INVENTION

The present invention is a statically and dynamically pressure balanced fluid control valve. The valve contains a spool that is moved within an inner chamber of a valve housing by a pair of solenoids. The ports are symmetrically located on each side of a center port, wherein the resultant fluid forces on the spool are in opposite directions. The opposing forces create a net fluid force of approximately zero, so that the spool is dynamically pressure balanced when the valve is switched to a new position. The spool also has an inner channel and a pair of end openings that are in fluid communication with the inner chamber of the valve.

When the spool is pulled to a new position, the end openings and inner channel allow fluid within the inner chamber to flow out of the space between the end of the spool and the housing. The flow of fluid through the end openings and inner channel prevent the formation of hydrostatic fluid pressure that will counteract the movement of the spool. The end openings and inner channel thus statically pressure balance the spool within the valve.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
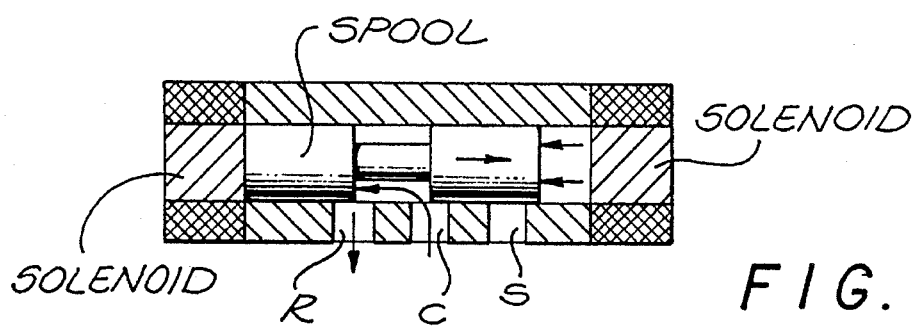
FIG. 1 is a schematic of a three-way fluid control valve of the prior art.
Figure 2:
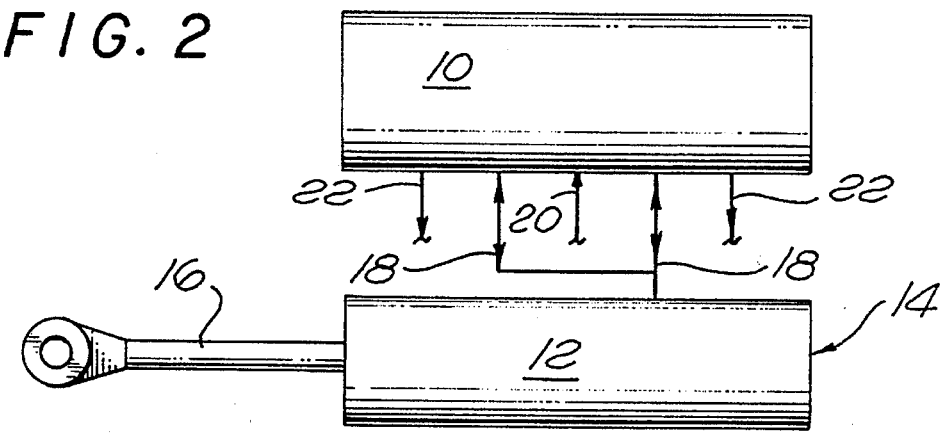
FIG. 2 is a schematic of a three-way fluid control valve of the present invention coupled to the cylinder of an actuator.

Referring to the drawings more particularly by reference numbers, FIG. 2 shows a three-way fluid control valve 10 of the present invention. The valve 10 is typically used to control the flow of fluid within a system. By way of example, the control valve 10 is shown connected to the cylinder 12 of a linear actuator 14. The output shaft 16 of the actuator moves in an outward direction when a pressurized fluid is introduced to the cylinder 12, and moves in an inward direction when fluid is allowed to flow out of the cylinder 12. The valve 10 has a pair of cylinder ports 18 that are both coupled to the cylinder 12 of the actuator 14. The valve 10 also has a single supply port 20 that is coupled to a source of pressurized fluid and a pair of return ports 22 each coupled to a return line. The valve 10 can be switched between a first position that couples the cylinder ports 18 to the supply port 20 to allow fluid to flow into the cylinder 12, and a second position that couples the cylinder ports 18 to the return ports 22 to allow fluid to flow out of the cylinder 12. Although an actuator 14 is described and shown, it is to be understood that the control valve 10 of the present invention can be connected to any device.

Figure 3:
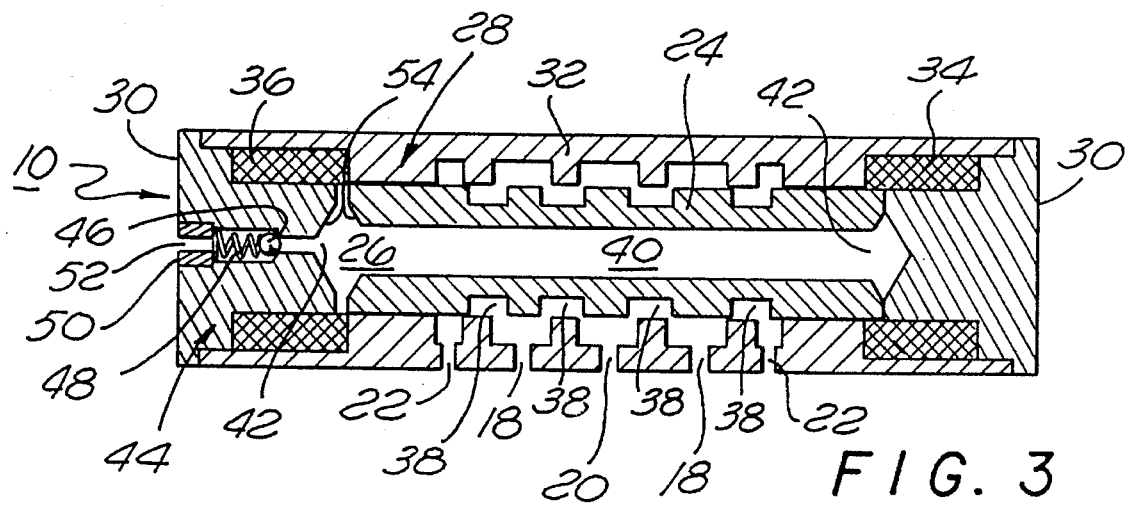
FIG. 3 is a cross-sectional view of the valve showing a spool in a first position.
Figure 4:
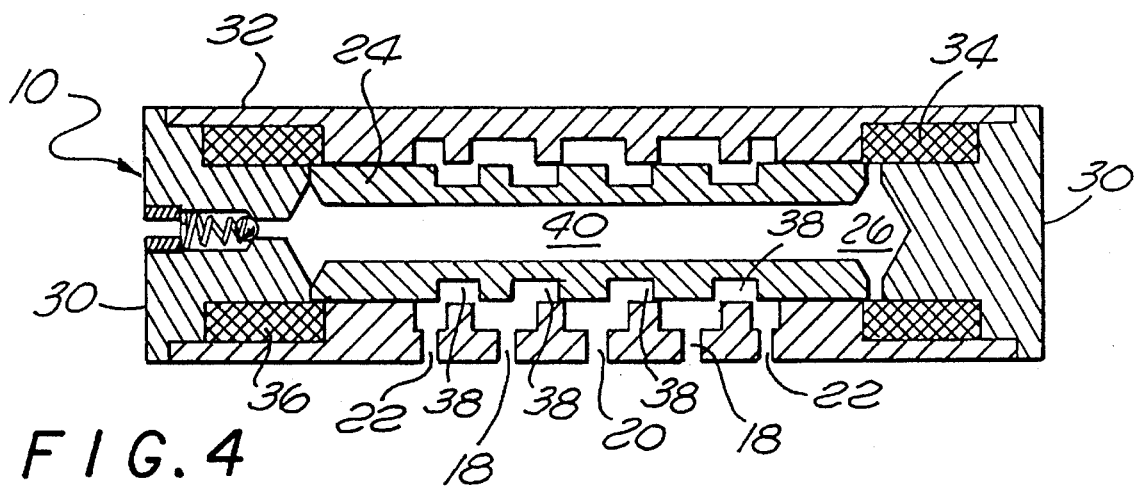
FIG. 4 is a cross-sectional view of the valve showing a spool in a second position.

As shown in FIGS. 3 and 4, the valve 10 contains a spool 24 that moves within the inner chamber 26 of a housing 28. In the preferred embodiment, the housing 28 is assembled from end caps 30 that are attached to a cylindrical shell 32. Within the housing 28 is a first solenoid 34 that can pull the spool 24 to the first position shown in FIG. 3, and a second solenoid 36 that can move the spool 24 to the second position shown in FIG. 4. The solenoids 34 and 36 are connected to an external current source which can energize one of the solenoids to move the spool 24 to the desired position. In the preferred embodiment, both the housing 28 and the spool 24 are constructed from a magnetic steel such as 4140 or 52100. The hysteresis of the magnetic steel is such that the attractive pull of the spool 24 and the housing 28 will maintain the position of the spool even when the solenoid is de-energized. The magnetic steel allows the valve to be operated in a digital manner, wherein one solenoid is energized for a predetermined time interval until the spool 24 is adjacent to an inner surface of an end cap 30. Once the spool 24 has reached the new position, the solenoid is de-energized, wherein the hysteresis of the magnetic steel material maintains the position of the spool 24.

The spool 24 has four outer grooves 38 that couple the cylinder ports 18 to either the supply port 20 or the return ports 22. When the spool 24 is in the first position shown in FIG. 3, the cylinder ports 18 are in fluid communication with the supply port 20. When the spool 24 is in the second position shown in FIG. 4, the cylinder ports 18 are coupled to the return ports 22.

The cylinder ports 18 are located on each side of the supply port 20 to dynamically balance the valve 10 when the spool 24 is moved from the first position to the second position. As shown in FIG. 3, the fluid flowing through the cylinder ports has an associated resultant force that is applied to the spool 24 as indicated by the arrows. Placing the ports 18 on each side of the supply port 20 produces resultant fluid forces that are applied to the spool 24 in opposite directions. The opposing forces offset each other, so that the fluid forces do not counteract the pulling force of the second solenoid 36 on the spool 24. Likewise, the return ports 22 are located on each side of the cylinder ports 20 so that the resultant forces created by the fluid flowing through the return ports cancel each other, thereby preventing a counteracting force from impeding the pulling force of the first solenoid 34. The port locations of the valve thus provide a fluid control valve that is dynamically pressure balanced. Balancing the spool 24 increases the response time of the valve and reduces the energy required by the solenoids to pull the spool 24 from one position to another.

The spool 24 has an inner channel 40 and a pair of end openings 42 that are in fluid communication with the inner chamber 26 of the housing 28. The end openings 42 and inner channel 40 allow fluid within the inner chamber 36 to flow away from the end of the spool 24, when the spool 24 is pulled to a new position. By way of example, when the second solenoid 36 pulls the spool 24 toward the end cap 30, the fluid between the end of the spool 24 and the housing 28 is allowed to flow into the inner channel 40 through the end opening 42. The flow of fluid prevents a build-up of hydrostatic pressure which may counteract the pull of the solenoid. The inner channel 40 and end openings 42 thus statically pressure balance the spool 24.

The valve 10 may have a pressure relief valve 44 that releases fluid when the fluid pressure within the inner chamber 26 exceeds a predetermined value. The relief valve 44 may have a ball 46 that is biased into a closed position by a spring 48. The relief valve 44 may also have an insert 50 with an outlet port 52. The ends of the spool and the inner surface of the end caps 30 may have chamfered surfaces 54 to increase the volume of the inner chamber 26 between the spool 24 and the housing 28 and reduce the hydrostatic pressure within the valve 10.

In operation, the first solenoid 34 is energized and the spool 24 is pulled to the first position so that the cylinder ports 18 are in fluid communication with the supply port 20. The location of the ports dynamically balances the spool so that the solenoid does not have to overcome the resultant forces of the fluid. The inner channel 40 and end openings 42 also allow fluid to flow Within the inner chamber 26 so that the spool 24 is statically pressure balanced. The first solenoid 34 is de-energized, wherein the hystersis of the spool 24 and housing 28 maintain the spool 24 in the first position. The second solenoid 36 is energized to pull the spool 24 to the second position.

The second solenoid 36 is then de-energized, wherein the hystersis of the steel material maintains the spool 24 in the second position. Although one set of supply, cylinder and return ports are shown and described, it is to be understood that the valve may have multiple sets of balanced valve ports.

Figure 5:
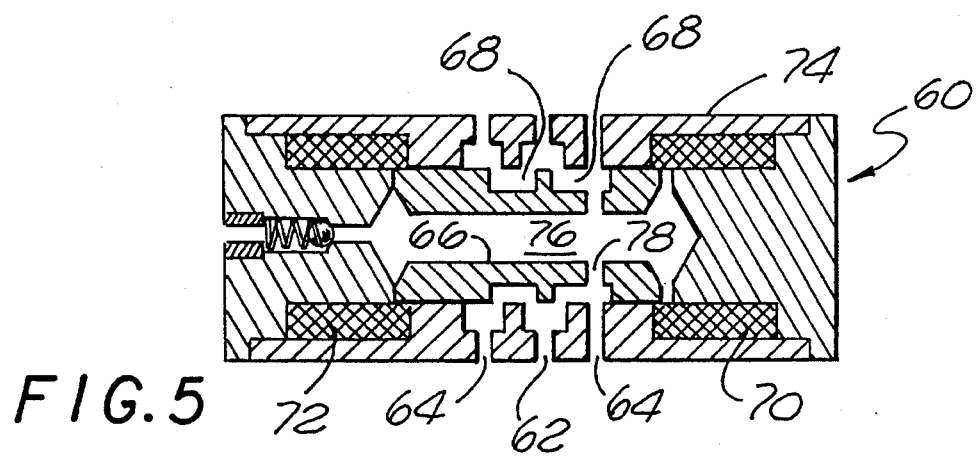
FIG. 5 is a cross-sectional view of a two-way valve.

FIG. 5 shows an alternate embodiment of a pressure balanced two-way valve 60. The two-way valve 60 has a first port 62 and a pair of second ports 64. The spool 66 has grooves 68 that provide fluid communication between the ports 62 and 64. The spool 66 is coupled to solenoids 70 and 72 that are located within valve housing 74. When solenoid 70 is energized, the spool 66 is in a first position to prevent fluid communication between the ports 62 and 64. When the solenoid 72 is energized, the spool 66 is moved to a second position to allow fluid communication between the ports 62 and 64. The location of ports 64 on each side of port 62 provides a dynamically balanced two-way valve. The spool 66 also has an inner channel 76 that provides a hydrostatically balanced valve. The inner channel 76 may be coupled to one of the ports 64 by passage 78 to drain the fluid within the spool 66.

Figure 6:
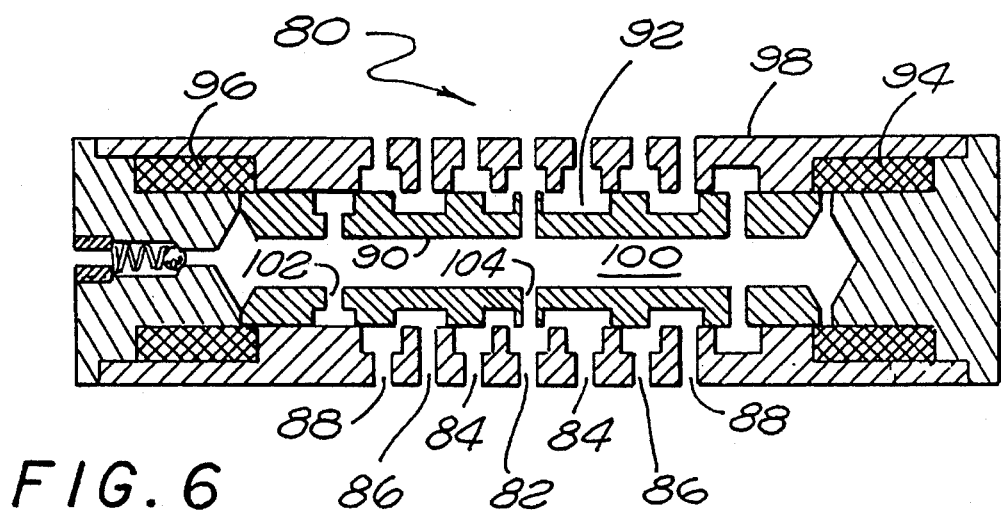
FIG. 6 is a cross-sectional view of a four-way valve.

FIG. 6 shows an alternate embodiment of a pressure balanced four-way valve 80. The four-way valve 80 has a first port 82, a pair of second ports 84, a pair of third ports 86 and a pair of fourth ports 88. The spool 90 has grooves 92 that provide fluid communication between the ports. The spool 90 is coupled to a first solenoid 94 and a second solenoid 96 that are located within valve housing 98. When the first solenoid 94 is energized, the spool 90 allows fluid communication between the first port 82 and the second ports 84, and between the third ports 86 and the fourth ports 88. When the second solenoid 96 is energized the second ports 84 are in fluid communication with the third ports 86, and the first port 82 is in fluid communication with fourth ports 88 through the inner channel 100 and passages 102 and 104. The inner channel 100 and symmetric ports provide a hydrostatically, dynamically balanced four-way control valve.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A fluid control valve, comprising:

a housing that has a first external port and a pair of second external ports;

a spool that can move between a first position and a second position within said housing, said spool having a ridge that cooperates with said housing to prevent fluid communication between said first external ports and said second external ports when said spool is in the first position, and a plurality of outer grooves that each have a pair of opposing walls and which provide fluid communication between said first external port and both second external ports when said spool is in the second position, wherein fluid flows between said first and second external ports such that the fluid exerts essentially equal and opposite fluid forces on said walls of said outer grooves; and, a first solenoid that moves said spool to the first position.

2. The valve as recited in claim 1, wherein said spool moves within an inner chamber of said housing, said spool having an inner channel and a pair of end openings in fluid communication with said inner chamber.

3. The valve as recited in claim 2, further comprising a pressure relief valve operatively connected to said inner chamber.

4. The valve as recited in claim 2, wherein said spool has chamfered surfaces at each end of said spool.

5. he valve as recited in claim 1, wherein said movement system further comprising a second solenoid that moves said spool to the second position.

6. The valve as recited in claim 5, wherein said housing and said spool are constructed from a magnetic steel that maintains said spool in position even when said solenoids are de-energized.

7. A fluid control valve, comprising:
a housing that has an inner chamber, a first external port, a pair of second external ports;
a spool that can move between a first position and a second position within said inner chamber of said housing, said spool having a ridge that cooperates with said housing to prevent fluid communication between said first external port and said second external ports when said spool is in the first position, and a plurality of grooves that each have a pair of opposing walls and which provide fluid communication between said first external port and both second external ports when said spool is in the second position, said spool having an inner channel and a pair of end openings that are in fluid communication with said inner chamber, wherein fluid flows between said first and second external ports such that the fluid exerts essentially equal and opposite fluid forces on said walls of said grooves;
a first solenoid that moves said spool to the first position; and,
a second solenoid that moves said spool to the second position.

8. The valve as recited in claim 7, wherein said housing and said spool are constructed from a magnetic steel that maintains said spool in position even when said solenoids are de-energized.

9. The valve as recited in claim 8, further comprising a pressure relief valve operatively connected to said inner chamber.

10. The valve as recited in claim 9, wherein said spool has chamfered surfaces at each end of said spool.

11. A fluid control valve, comprising:
a housing that has a first port, a pair of second ports located on each side of said first port and coupled to a first common fluid line, and a pair of third ports located on each side of said second ports and coupled to a second common fluid line;
a spool that can move between a first position and a second position within said housing, said spool having outer grooves that couple said first port to said second ports when said spool is in the first position, and couple said second ports to said third ports when said spool is in the second position, wherein fluid flows between said ports such that the fluid exerts essentially equal and opposite fluid forces on said spool; and,
a movement system that moves said spool between the first and second positions.

12. The valve as recited in claim 11, wherein said spool moves within an inner chamber of said housing, said spool having an inner channel and a pair of end openings in fluid communication with said inner chamber.

13. The valve as recited in claim 12, further comprising a pressure relief valve operatively connected to said inner chamber.

14. The valve as recited in claim 12, wherein said spool has chamfered surfaces at each end of said spool.

15. The valve as recited in claim 11, wherein said movement system includes a first solenoid that moves said spool to the first position.

16. The valve as recited in claim 15, wherein said movement system further includes a second solenoid that moves said spool to the second position.

17. The valve as recited in claim 16, wherein said housing and said spool are constructed from a magnetic steel that maintains said spool in position even when said solenoids are de-energized.

18. A fluid control valve, comprising:
a housing that has an inner chamber, a first port and coupled to a first common fluid line, a pair of second ports located on each side of said first port, and a pair of third ports located on each side of said second ports and coupled to a second common fluid line;
a spool that can move between a first position and a second position within said inner chamber of said housing, said spool having outer grooves that couple said first port to said second ports when said spool is in the first position, and couple said second ports to said third ports when said spool is in the second position, said spool having an inner channel and a pair of end openings that are in fluid communication with said inner chamber wherein fluid flows between said ports such that the fluid exerts essentially equal and opposite fluid forces on said spool;
a first solenoid that moves said spool to the first position; and,
a second solenoid that moves said spool to the second position.

19. The valve as recited in claim 18, wherein said housing and said spool are constructed from a magnetic steel that maintains said spool in position even when said solenoids are de-energized.

20. The valve as recited in claim 19, further comprising a pressure relief valve operatively connected to said inner chamber.

21. The valve as recited in claim 20, wherein said spool has chamfered surfaces at each end of said spool.

22. A fluid control valve, comprising:
a housing that has a first port, a pair of second ports located on each side of said first port and coupled to a first common fluid line, a pair of third ports located on each side of said second ports and coupled to a second common fluid line and a pair of fourth ports located on each side of said third ports and coupled to a third common fluid line;
a spool that can move between a first position and a second position within said housing, said spool having outer grooves that couples said first port to said second ports and said third ports to said fourth ports when said spool is in the first position, and couples said first port to said fourth ports and said second ports to said third ports when said spool is in the second position, wherein fluid flows between said ports such that the fluid exerts essentially equal and opposite forces on said spool; and,
a movement system that moves said spool between the first and second positions.

23. The valve as recited in claim 22, wherein said spool moves within an inner chamber of said housing, said spool having an inner channel and a pair of end openings in fluid communication with said inner chamber.

24. The valve as recited in claim 23, further comprising a pressure relief valve operatively connected to said inner chamber.

25. The valve as recited in claim 23, wherein said spool has chamfered surfaces at each end of said spool.

26. The valve as recited in claim 22, wherein said movement system includes a first solenoid that moves said spool to the first position.

27. The valve as recited in claim 26, wherein said movement system further includes a second solenoid that moves said spool to the second position.

28. The valve as recited in claim 27, wherein said housing and said spool are constructed from a magnetic steel that maintains said spool in position even when said solenoids are de-energized.

29. A fluid control valve, comprising:

a housing that has an inner chamber, a first port and coupled to a first common fluid line, a pair of second ports located on each side of said first port, a pair of third ports located on each side of said second ports and coupled to a second common fluid line and a pair of fourth ports located on each side of said third ports and coupled to a third common fluid line;

a spool that can move between a first position and a second position within said inner chamber of said housing, said spool having outer grooves that couple said first port to said second ports and said third ports to said fourth ports when said spool is in the first position, and couples said first port to said fourth ports and said second ports to said third ports when said spool is in the second position, said spool having an inner channel and a pair of end openings that are in fluid communication with said inner chamber, wherein fluid flows between said ports such that the fluid exerts essentially equal and opposite forces on said spool;

a first solenoid that moves said spool to the first position; and, a second solenoid that moves said spool to the second position.

30. The valve as recited in claim 29, wherein said housing and said spool are constructed from a magnetic steel that maintains said spool in position even when said solenoids are de-energized.

31. The valve as recited in claim 30, further comprising a pressure relief valve operatively connected to said inner chamber.

32. The valve as recited in claim 31, wherein said spool has chamfered surfaces at each end of said spool.

* * * * *

UNITED STATES PATENT AND TRADEMARK OFFICE
CERTIFICATE OF CORRECTION

| | | |
|---|---|---|
| PATENT NO. | : | 5,598,871 |
| DATED | : | February 4, 1997 |
| INVENTOR(S) | : | Sturman et al. |

It is certified that error appears in the above-identified patent and that said Letters Patent is hereby corrected as shown below:

In the title page, item [73, please delete " Assignee: Sturman Industries, Camarillo, Calif. and insert -- Sturman, Oded E., Newbury Park, Calif. --..

In column 3 at line 64, please delete " Within " and insert -- within --.

In column 4, claim 1 at line 57, please delete " ports " and insert -- port --.

In column 5, claim 5 at line 9-10, please delete " wherein said movement system ".

In column 5, claim 5 at line 9, please delete " he " and insert -- the --.

Signed and Sealed this

Tenth Day of November 1998

*Attest:*

BRUCE LEHMAN

*Attesting Officer*     *Commissioner of Patents and Trademarks*